United States Patent [19] [11] 4,408,950
Laskey [45] Oct. 11, 1983

[54] PRESS LOADER

[76] Inventor: Ben G. Laskey, 741 Hurlingame Ave., Redwood City, Calif. 95063

[21] Appl. No.: 379,168

[22] Filed: May 17, 1982

Related U.S. Application Data

[63] Continuation of Ser. No. 163,056, Jun. 26, 1980, abandoned.

[51] Int. Cl.3 .............................................. B65G 47/96
[52] U.S. Cl. .................................... 414/749; 100/224
[58] Field of Search ................ 414/749, 750; 100/224; 271/164, 162, 84, 267; 198/750; 104/126; 105/7

[56] References Cited

U.S. PATENT DOCUMENTS

| | | | |
|---|---|---|---|
| 1,538,474 | 5/1925 | Daniels | 414/750 |
| 3,207,065 | 9/1965 | Danly | 414/749 |
| 3,753,489 | 8/1973 | Tomioka et al. | 414/750 |
| 4,003,476 | 1/1977 | Laskey | 414/749 |

FOREIGN PATENT DOCUMENTS

| | | | |
|---|---|---|---|
| 528974 | 6/1931 | Fed. Rep. of Germany | 100/224 |
| 590266 | 12/1933 | Fed. Rep. of Germany | 100/224 |
| WO80/00690 | 4/1980 | PCT Int'l Appl. | 414/749 |

*Primary Examiner*—Trygve M. Blix
*Assistant Examiner*—Thomas J. Brahan
*Attorney, Agent, or Firm*—Robert G. Slick

[57] ABSTRACT

An improved press loader is disclosed having two reciprocating tables wherein one table is unloaded and loaded while the press is acting upon the other table and the position of the tables is then reversed for a repetition of the operation. Each table rolls on its own set of rails and the rails are solid, extending from the front to the back of the press.

5 Claims, 8 Drawing Figures

PRESS LOADER

This is a continuation of application Ser. No. 163,056, filed June 26, 1980 now abandoned.

SUMMARY OF THE INVENTION

The present invention relates to an improved loading machine for a flat bed press. Such presses are well known and can be used for a variety of operations such as electronic heat sealing machines, hot stamp presses, silk screen machines, plastic forming machines and the like.

The present invention is an improvement over the machine described and claimed in my prior U.S. Pat. No. 4,003,476 and is designed to serve the same purpose. Although my prior machine was a substantial advance in the art as it existed at that time, it had the deficiency that it required split rails which must be brought into accurate alignment during each cycle of the press. This required extreme accuracy in manufacture and maintenance.

The present invention is an improvement over my prior machine primarily in the fact that it is not necessary to employ split rails, but each of the tables reciprocates on its own set of rails and these rails extend from the front of the machine to the back of the machine in unbroken form so that the alignment problem brought about by the split rails is obviated.

Another improvement of my new machine is the manner in which the tables are kept in alignment. In my prior machine the tables were mounted on rollers which moved in U-shaped tracks and of necessity these allowed the rollers to wobble slightly. In accordance with the present invention, each table has a pair of grooved rollers which move over a track of diamond shape so that the tables are maintained in their proper alignment even after the rollers and track have been subjected to a substantial amount of wear.

Summing up the above, the present invention is an improvement over my prior structure in that the accurate registration of the split tracks is obviated and the tables do not tend to get out of alignment even after the rollers and tracks have been subjected to a substantial amount of wear.

BRIEF DESCRIPTION OF THE PREFERRED EMBODIMENTS

Figure 1:
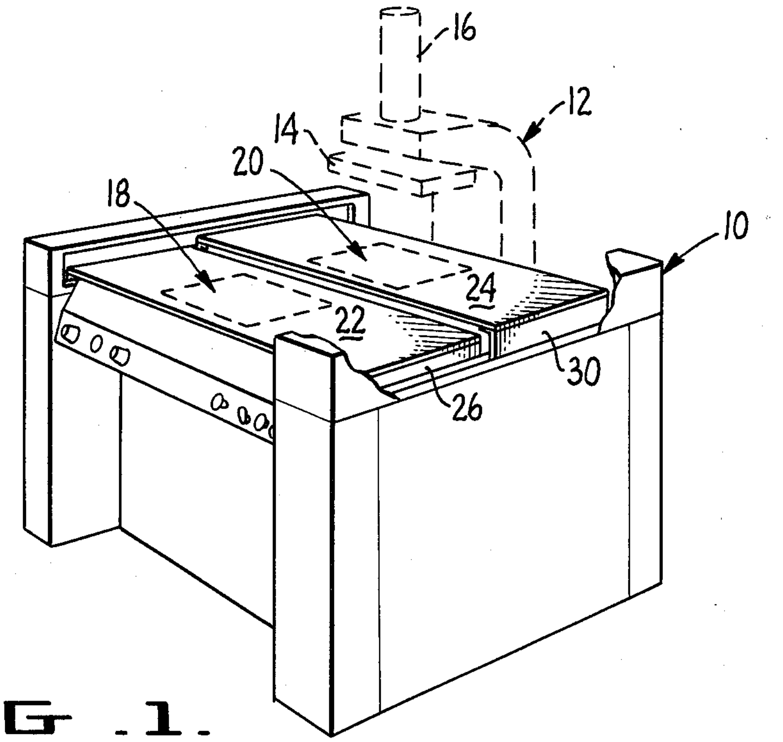
FIG. 1 is a perspective view of a loader embodying the present invention.

Referring now to the drawings by reference characters, the press loader is built into a housing 10 which is designated to fit adjacent to a standard pneumatic or mechanical press, designated 12. The press itself forms no part of the present invention and has thus been shown in phantom. It is not necessary to describe the press except to the extent of stating that the press has a plate element 14 with means 16 to raise and lower the plate against a platen where the actual press operation is conducted.

Figure 2:
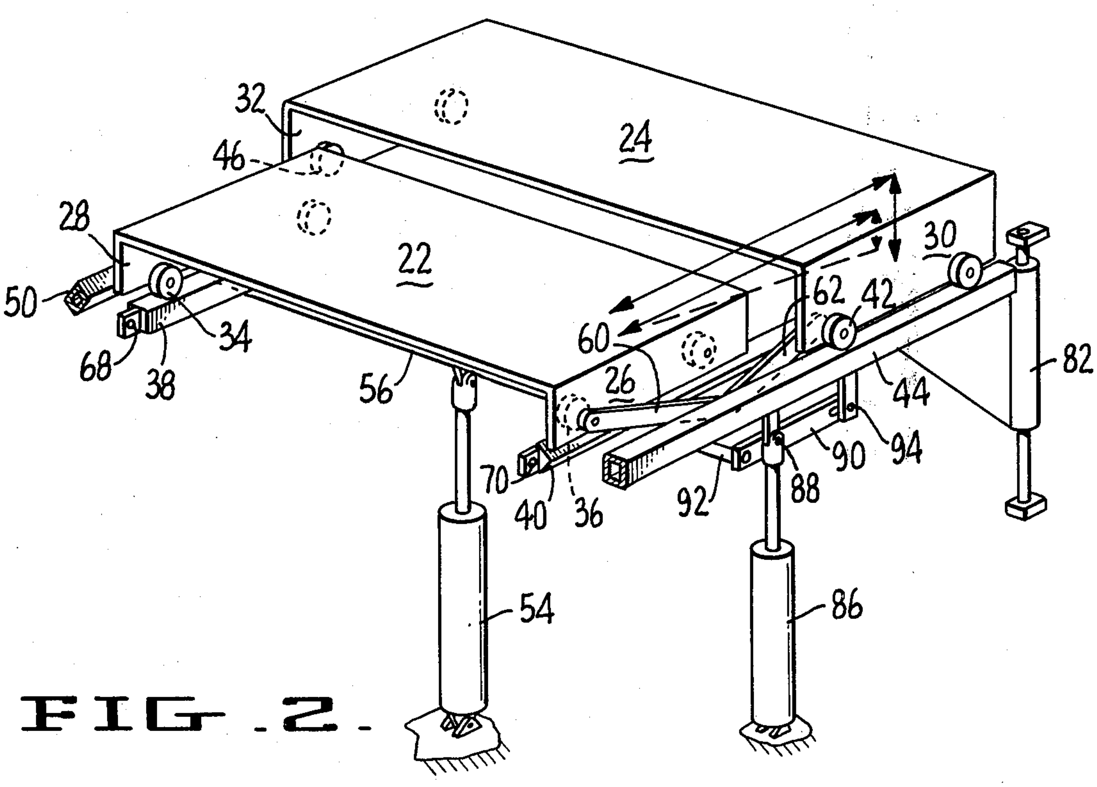
FIG. 2 is a partial perspective view of the loader showing the arrangement and movement of the tables and tracks.
Figure 8:
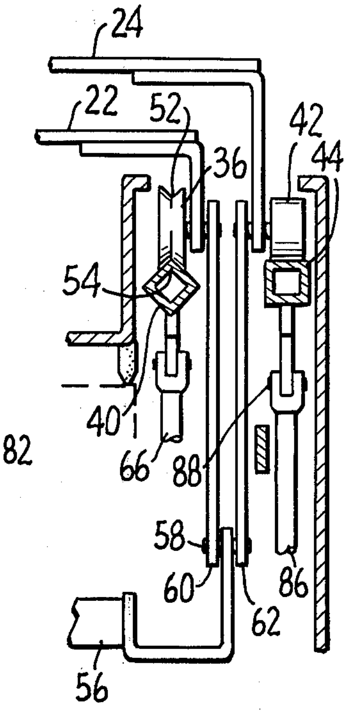
FIG. 8 is an enlarged section of one side of the machine showing the position of the rails and rollers.

The loader of the present invention includes two platens, generally designated 18 and 20 which hold the work on which the press operation is to be conducted. These platens are carried by tables 22 and 24, respectively. The table 22 has short flanges 26 and 28 while the table 24 has relatively long side flanges 30 and 32. Table 22 has a top which is slightly narrower than table 24 so that 22 can telescope within 24 as is best seen in FIG. 2. Table 22 has rollers 34 and 36 which are adapted to permit the table to roll back and forth on the tracks 38 and 40. Rollers 34 and the mating track 38 are flat, as shown, while the roller 36 is "V" grooved and the track 40 has a mating angular wearing surface the purpose of which is later described. Similarly, table 24 has a pair of flat rollers 42 which move on the flat track 44, while at the opposite side the table is supported by the grooved rollers 46 which enable the table to move over the angular track 50. This relationship is best seen in FIG. 8 wherein the roller 36 is shown with a central V-shaped groove 52 which causes it to be in accurate alignment with the mating angular track 40, wherein the top portion of the track at 54 mates with groove 52.

Table 24 is supported on the flat rollers 42 which mate with the flat track 44. The situation is reversed, of course, at the opposite side of the machine, table 24 being provided with a grooved roller and table 22 with a flat roller. Thus, both tables are kept in accurate alignment by means of the grooved rollers on one side of each table, and this proper positioning will be maintained even after there has been a substantial amount of wear.

Figure 3:
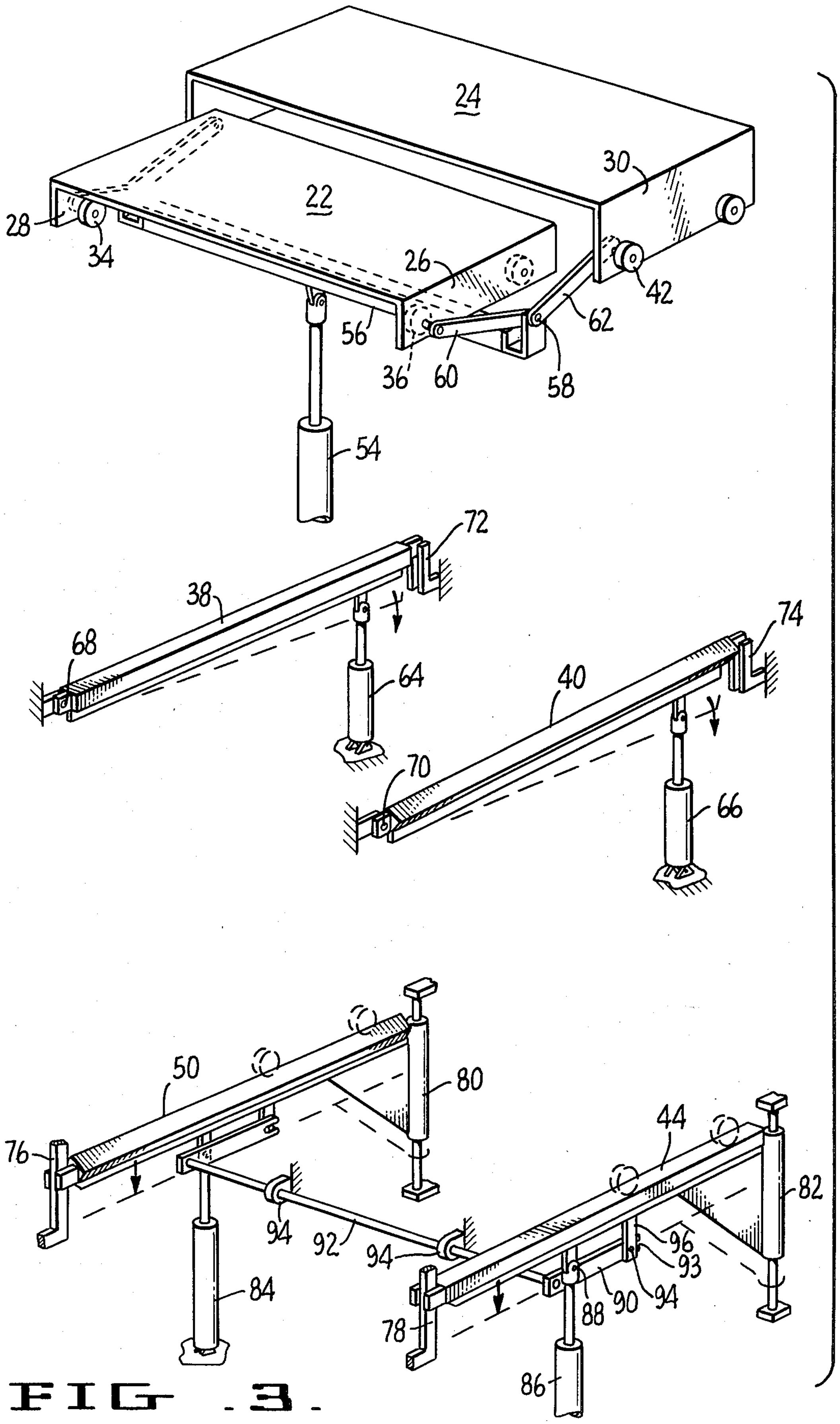
FIG. 3 is an exploded view of the structure shown in FIG. 2 which better illustrates the movement of the track.

The back and forth motion of the tables is brought about by a pneumatic cylinder 56 which is connected to a cross-member 56 to which is connected the pivot 58 on which are pivoted the toggle arms 60 and 62. Toggle arm 60 is pivoted to table 22, while toggle arm 62 is pivoted to table 24. There is a corresponding linkage and toggle arms at the opposite side of the machine. Pneumatic cylinders 64 and 66 are pivoted to the rails 38 and 40, respectively, as shown. The rails 38 and 40 are pivoted at the front of the machine at points 68 and 70, respectively, while the front ends of these rails operate in the guides 72 and 74. Thus the rails can be tilted from the position shown in solid lines to the position shown in dashed lines by means of these pneumatic cylinders. The outer rails 50 and 44 are adapted to slide on the guides 76 and 78 at the front of the machine, and the opposite ends are adapted to slide on the guides 80 and 82 so that these rails can be moved in an up and down position as shown from solid lines to dashed lines in FIG. 3. This movement is brought about by the pneumatic cylinders 84 and 86. Cylinder 86 is pivoted to rail 44 at point 88 and is also pivoted to the arm 90. Arm 90 is connected to a rod 92 which extends from one side of the machine to the other and is supported by the bearings 94 so that the rod can turn. The front part of arm 90 is slotted at 93, and a pin 94 connects this to an extension 96 extending downwardly from rail 44. There is a corresponding linkage at the opposite side of the machine which is not specifically described. In this manner, the cylinders 84 and 86 can cause the rails 44 and 50 to move up and down from the position shown in solid lines to the position shown in dashed lines in FIG. 3. The action of the cross-rod 92 is such that these rails are maintained even with each other at all times.

Figure 4:
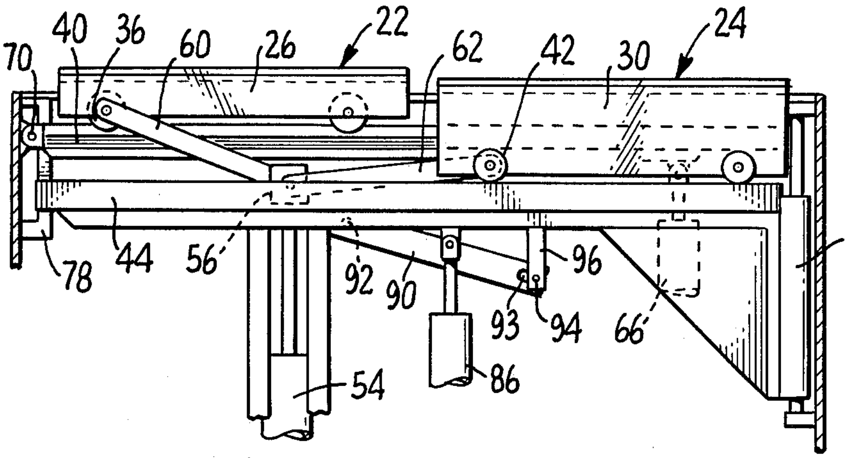
FIG. 4 is a side view showing the position of the tables while the large table is in the operative position for a press operation and the small table is in a loading position.
Figure 5:
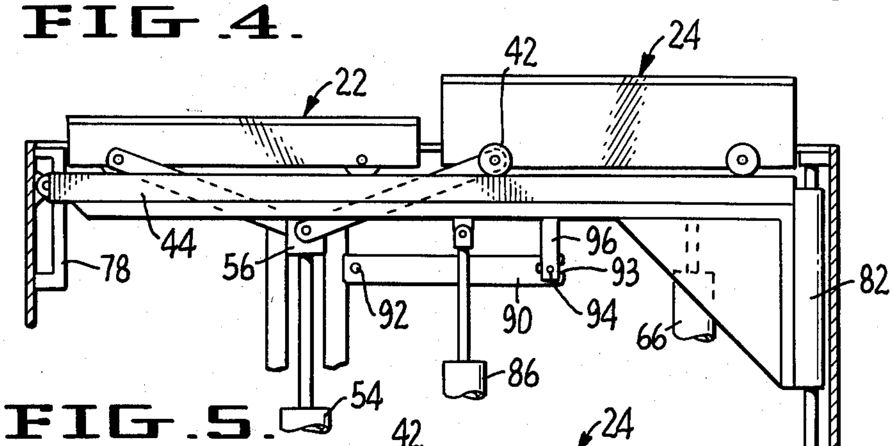
FIG. 5 shows the position of the tables just after a press operation has been completed, as well as a loading operation.
Figure 6:
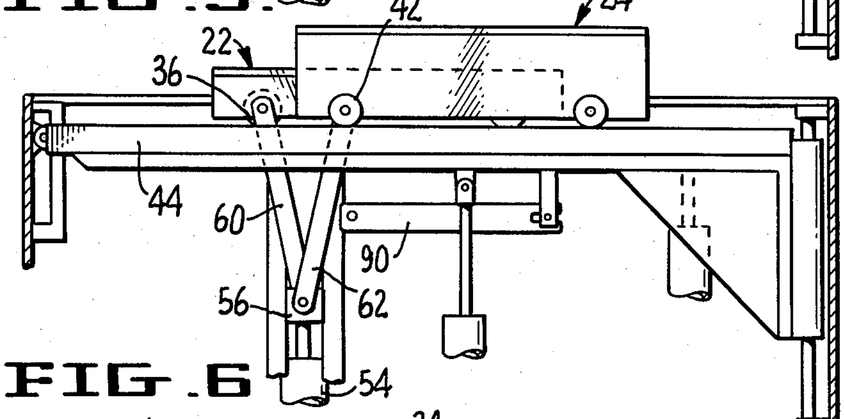
FIG. 6 is a similar view showing how the small table telescopes within the large table.
Figure 7:
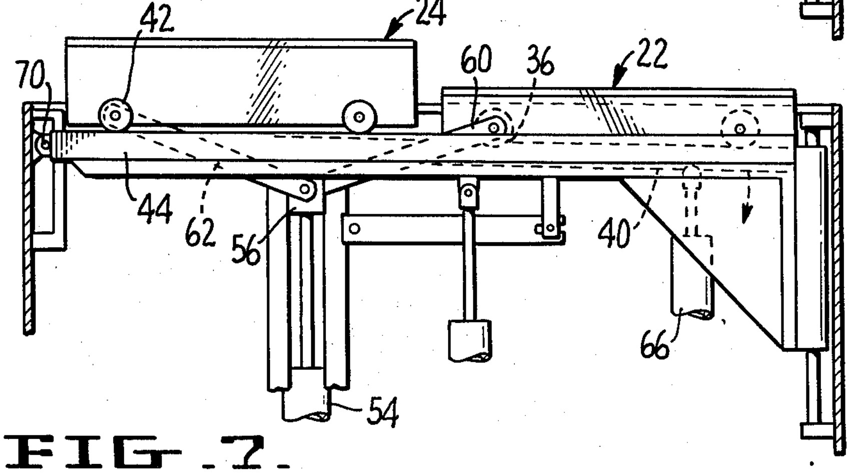
FIG. 7 is a side view showing the position of the parts when a press operation is taking place on the small table and the large table is being loaded.

The operation of the machines is best shown in FIGS. 4–7. In FIG. 4, table 22 is at the front of the machine so that a new article can be loaded upon the table. Table 24 is at the rear of the machine in the press operating position so that an actual operation can be conducted upon the article located on table 24. In this position, rails 44 and 50 are in their downmost position and rails 30 and 40 are also in the down position. Now when the loading and press operations are completed, the parts move to the position shown in FIG. 5 wherein cylinder 54 has caused the toggle arms to retract partially and the rails 44 and 50 have been raised. As cylinder 54 continues to retract to the position shown in FIG. 6, table 22 passes under table 24 so that the position of the tables is reversed. This inertia of the tables causes them to pass through dead center without power being applied. Now, as the cylinder 54 moves upwardly, table 24 is moved into the loading position and table 22 will be moved into the press operating position. At the same time, cylinders 64 and 66 cause rails 38 and 40 to rise so that table 22 is now at the proper height for the press operation to be completed. At the completion of a press operation on table 22 and a loading operation on table 24, the movement of the tables is reversed so that the parts successively assume the positions shown in FIGS. 7, 6, 5 and finally the position shown in FIG. 4. Now one cycle is complete so that a press operation can again be conducted on table 24 and a loading operation on table 22.

It is apparent from the above description that the operation can be conducted very fast. The forward table is loaded by the operator while the rear table is having actual press operation conducted thereon. The tables then reverse positions whereupon the forward table can be unloaded and a new article placed thereon while the press operation is conducted on the rear table. Further, it is apparent that the operator is well protected from contact with the press and never needs to put his hands near any dangerous parts.

It will also be apparent from the above description that the operation is completely positive. There is no need for the precise alignment which was required when using tables operating on split rails wherein the tables must move from one set of rails to the other. Further, by the use of the grooved rollers, accurate alignment is achieved at all times and there is substantially no side play. Thus, as wear takes place, the parts are kept accurately in position.

Although a specific embodiment of the invention has been described, it will be obvious to those skilled in the art that many variations can be made in the exact structure shown without departing from the spirit of this invention.

The subject matter to be claimed is:

1. A press loader comprising a pair of first and second tables, said tables being telescopic and movable between a loading station and a horizontally spaced press operating station, means for moving said tables simultaneously and alternately between said stations, and an improved means for suppporting said tables comprising:
- a first pair of parallel rails for supporting said first table, said rails extending between said loading station and said press operating station;
- a second pair of parallel rails for supporting said second table, said rails extending between said loading station and said press operating station, said second pair of rails being parallel to and between said first pair of rails;
- means for raising and lowering said first pair of rails between a loading position and a press operating position; and
- means for raising and lowering said second pair of rails between a loading position and a press operating position.

2. The apparatus of claim 1, said second pair of rails being pivotally mounted at one end and vertically guided at the other end.

3. The apparatus of claim 1, said first pair of rails being horizontally supported and guided at both ends, a guide member being secured at one end of each rail restricting rail movements to vertical reciprocation.

4. The apparatus of claim 3, said first pair of rails being interconnected by an actuating means for raising and lowering one rail in response to movement of the other rail.

5. The apparatus of claim 4, said actuating mechanism comprising a rod supported in bearings, a pair of crank arms secured to said rod, the end of each rod being slotted, a pair of pins engaged with the slotted ends respectively, said pins being mounted to an extension of each rail, respectively.

* * * * *